(12) United States Patent
Kia (10) Patent No.: US 10,113,250 B2
(45) Date of Patent: *Oct. 30, 2018

(54) MODIFICATION OF CONTINUOUS CARBON FIBERS DURING MANUFACTURING FOR COMPOSITES HAVING ENHANCED MOLDABILITY

(71) Applicant: GM Global Technology Operations LLC, Detroit, MI (US)

(72) Inventor: Hamid G. Kia, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/849,025

(22) Filed: Sep. 9, 2015

(65) Prior Publication Data
US 2017/0067186 A1    Mar. 9, 2017

(51) Int. Cl.
*D01F 9/12*  (2006.01)
*D01F 9/22*  (2006.01)
(Continued)

(52) U.S. Cl.
CPC .............. *D01F 9/22* (2013.01); *C04B 35/524* (2013.01); *D01D 10/00* (2013.01); *D01F 9/14* (2013.01); *C08J 5/042* (2013.01)

(58) Field of Classification Search
CPC .......... D01F 9/22; C04B 35/524; D01D 10/00
See application file for complete search history.

(56) References Cited

U.S. PATENT DOCUMENTS

| 3,458,615 A | 7/1969 | Bragaw, Jr. et al. |
| 3,699,210 A * | 10/1972 | Binning .................... D01F 9/22 |
| | | 204/157.41 |

(Continued)

FOREIGN PATENT DOCUMENTS

| CN | 102965928 A | 3/2013 |
| CN | 104024494 A | 9/2014 |

(Continued)

OTHER PUBLICATIONS

Cytec Industries Inc.; Safety Data Sheet for VTM® 264 Prepreg; Aug. 5, 2013; 9 pages.

(Continued)

*Primary Examiner* — Richard M Rump
(74) *Attorney, Agent, or Firm* — Harness, Dickey & Pierce, P.L.C.

(57) ABSTRACT

Methods of producing continuous carbon fibers for composites having enhanced moldability are provided. Discrete regions are introduced into a continuous precursor fiber comprising an acrylic polymer material, such as polyacrylonitrile (PAN) during carbon fiber manufacture. Laser energy may be applied to the precursor fiber while it is in an oven or furnace to create heterogeneous fibers with discrete regions where laser energy is applied. In other aspects, mechanical pressure may be intermittently applied to create the discrete regions. After the continuous precursor fiber is fully heated for carbonization and/or graphitization, the precursor forms a continuous carbon fiber having a plurality of discrete weak regions. These relatively weak regions provide noncontiguous break points that reduce stiffness and improve moldability for carbon fiber polymeric composites, while retaining high strength levels. Carbon fiber polymeric composites incorporating continuous carbon fibers having (Continued)

the plurality of discrete noncontiguous weak regions are also provided.

12 Claims, 4 Drawing Sheets

(51) Int. Cl.
*C04B 35/524* (2006.01)
*D01D 10/00* (2006.01)
*D01F 9/14* (2006.01)
*C08J 5/04* (2006.01)

(56) References Cited

U.S. PATENT DOCUMENTS

| | | | |
|---|---|---|---|
| 5,017,423 A | 5/1991 | Bossmann et al. | |
| 5,024,818 A | 6/1991 | Tibbetts et al. | |
| 5,582,912 A | 12/1996 | McCullough, Jr. et al. | |
| 6,638,883 B2 | 10/2003 | Gaffney et al. | |
| 8,309,644 B1 | 11/2012 | Huang | |
| 9,896,783 B2 | 2/2018 | Kia | |
| 9,920,454 B2 | 3/2018 | Sutti et al. | |
| 2003/0100239 A1 | 5/2003 | Gaffney et al. | |
| 2004/0089129 A1 | 5/2004 | Toth | |
| 2010/0028593 A1 | 2/2010 | Taketa et al. | |
| 2012/0213997 A1 | 8/2012 | Wang et al. | |
| 2014/0264985 A1 | 9/2014 | Sutti et al. | |
| 2017/0067185 A1 | 3/2017 | Kia | |
| 2017/0314668 A1 | 11/2017 | Kia et al. | |
| 2018/0016740 A1 | 1/2018 | Kia et al. | |
| 2018/0085991 A1 | 3/2018 | Kia et al. | |

FOREIGN PATENT DOCUMENTS

| | | |
|---|---|---|
| CN | 106521716 A | 3/2017 |
| CN | 106521718 A | 3/2017 |
| CN | 107618194 A | 1/2018 |
| CN | 107866985 A | 4/2018 |
| DE | 3540411 A1 | 5/1987 |
| DE | 19944164 A1 | 6/2000 |
| DE | 102016116053 A1 | 3/2017 |
| DE | 102016116662 A1 | 3/2017 |
| DE | 102017115451 A1 | 1/2018 |
| DE | 102017121837 A1 | 3/2018 |
| EP | 2127840 A1 | 12/2009 |
| EP | 2679619 A1 | 1/2014 |
| EP | 2862971 A1 | 4/2015 |
| GB | 2373793 A | 10/2002 |
| JP | 2001-73230 A | 3/2001 |
| WO | WO-2014100127 A1 | 6/2014 |

OTHER PUBLICATIONS

Cytec Industrial Materials; VTM® 264-1 & VTM® 264S-1; PDS1268_07.13_Issue1a; Jul. 17, 2013; 3 pages.

First Office Action for German Application No. 102016116662.6 dated Aug. 30, 2017; 6 pages.

First Office Action for German Application No. 102016116053.09 dated Aug. 29, 2017; 5 pages.

Hamid G. Kia et al.; U.S. Appl. No. 15/211,814, filed Jul. 15, 2016 entitled "Carbon Fiber Pre-Pregs and Methods for Manufacturing Thereof"; 44 pages.

Hamid G. Kia et al.; U.S. Appl. No. 15/685,157, filed Aug. 24, 2017 entitled "Modification of Continuous Carbon Fibers During Precursor for Composites Having Enhanced Moldability"; 40 pages.

Hamid G. Kia et al.; U.S. Appl. No. 15/141,361, filed Apr. 28, 2016 entitled "Linear Expansion Reduction of Metal Component Assemblies Using Composites"; 41 pages.

First Office Action for German Patent Application No. 102017115451.5 dated May 18, 2018 and correspondence dated May 28, 2018 from Manitz, Finsterwald & Partner summarizing contents; 5 pages.

First Office Action for Chinese Patent Application No. 201610771305.1 dated Jun. 12, 2018 with English language machine translation, 9 pages.

First Office Action for Chinese Patent Application No. 201610743811.X dated Jun. 21, 2018 with English language machine translation, 9 pages.

Polyacrylonitrile (PAN) Carbon Fibers Industrial Capability Assessment, OUSD (AT&L) Industrial Policy, U.S Department of Defense (Oct. 2005); 23 pages.

Technical Data Sheet, "Polyacrylonitrile (PAN): how is it made?", Toray Carbon Fibers Europe, downloaded from http://www.toray-cfe.com/index.php/en/newsletter-v2/42-product/48-polyacrylonitrile-pan-how-is-it made, (published on or before Aug. 14, 2015); 2 pages.

Park, Soon-Jin, et al., "Precursors and Manufacturing of Carbon Fibers," Springer Series in Materials Science, vol. 210 (Oct. 9, 2014); pp. 31-66.

Hamid G. Kia et al.; U.S. Appl. No. 15/836,315, filed Dec. 8, 2017 entitled "Equipment for Perforated Pre-Impregnated Reinforcement Materials"; 54 pages.

* cited by examiner

MODIFICATION OF CONTINUOUS CARBON FIBERS DURING MANUFACTURING FOR COMPOSITES HAVING ENHANCED MOLDABILITY

FIELD

The present disclosure relates to methods of manufacturing continuous carbon fibers to incorporate heterogeneity into the continuous carbon fibers that can improve moldability of high strength carbon fiber composites.

BACKGROUND

This section provides background information related to the present disclosure which is not necessarily prior art.

Carbon fibers are generally produced by carbonizing or graphitizing carbon fiber precursor material fibers. Conventional carbon fiber precursors may be formed from polyacrylonitrile (PAN), petroleum pitch, or rayon precursors, by way of example. Carbon fibers and graphite fibers are made and heat-treated at different temperatures and thus each has different carbon content. Typically a carbon fiber is fiber that has at least about 90% by weight carbon.

Carbon fibers are used as a light-weight reinforcement phase to make high-strength light-weight polymeric composite materials. The carbon fibers may be continuous filaments that may be thousands of micrometers ($\mu$m) or millimeters (mm) in length. A group of continuous carbon fibers are often categorized as a bundle of continuous carbon fiber filaments. Carbon fiber "tow" is usually designated as a number of filaments in thousands (designated by K after the respective tow number). Alternatively, carbon fiber bundles may be chopped or milled and thus form short segments of carbon fibers (filaments or bundles) typically having a mean fiber length between 50 $\mu$m and 50 mm (about 1.97 inches). While composites incorporating carbon fibers are all light-weight and high-strength, composites incorporating continuous carbon fiber filaments have especially high strength as compared to composites incorporating chopped or milled carbon fibers. By way of non-limiting example, a representative unidirectional continuous carbon fiber filament when incorporated into a composite has an ultrahigh ultimate tensile strength of about 1,500 to 2,000 MPa, while chopped carbon fibers have an ultimate tensile strength of about 200 MPa to 500 MPa.

While the ultrahigh strengths are highly desirable in certain applications, one technical challenge in using continuous carbon fibers in composites is the lack of flowability and formability, because composite pre-pregs incorporating continuous carbon fibers can be too stiff having high resistance to flow. Such inflexibility and rigidity translates to poor moldability, making it difficult to form three-dimensional shapes from composites having continuous carbon fibers. It would be desirable to form continuous carbon fiber composites having greater flexibility, higher flowability, and thus greater moldability with the capability of readily forming complex and three-dimensionally shaped components with ultrahigh-strengths.

SUMMARY

This section provides a general summary of the disclosure, and is not a comprehensive disclosure of its full scope or all of its features.

In various aspects, the present disclosure provides a method of manufacturing a continuous carbon fiber for use in composites having enhanced moldability. The method may comprise introducing a continuous precursor fiber comprising an acrylic polymer material into a heated environment. The method also includes directing laser energy towards a plurality of discrete target regions of the continuous precursor fiber while in the heated environment. This creates a continuous carbon fiber having a plurality of discrete weak regions corresponding to the plurality of discrete target regions.

In other aspects, the present disclosure contemplates another method of manufacturing a continuous carbon fiber for use in composites having enhanced moldability. The method may comprise introducing a continuous precursor fiber comprising an acrylic polymer material into a heated environment. A plurality of discrete noncontiguous weak regions is created by intermittently applying mechanical stress to discrete target regions of the continuous precursor fiber while in the heated environment. This creates a continuous carbon fiber having a plurality of discrete noncontiguous weak regions corresponding to the plurality of discrete target regions.

In yet another aspect, a method of manufacturing a continuous carbon fiber for use in composites having enhanced moldability is provided that comprises introducing a continuous precursor fiber comprising an acrylic polymer material into an oxidation oven or furnace for thermally stabilizing the precursor fiber. The method may also include introducing the precursor fiber into a carbonization oven or furnace for carbonizing the precursor fiber to form a continuous carbon fiber. Then, mechanical stress and/or laser ablation is applied intermittently to discrete target regions of the continuous carbon fiber to create a plurality of discrete noncontiguous intact weak regions in the continuous carbon fiber.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters.

In addition, disclosure of ranges includes disclosure of all values and further divided ranges within the entire range, including endpoints and sub-ranges given for the ranges.

Example embodiments will now be described more fully with reference to the accompanying drawings.

In various aspects, the present disclosure provides methods for improving moldability of composites having carbon fibers as a reinforcement phase. As noted above, while polymeric composites incorporating carbon fibers are high-strength and light-weight, they are typically difficult to make into complex three-dimensional shaped components. Carbon-fiber reinforced polymeric composites (CFRP) comprise a resin that is cured and/or solidified to form a polymeric matrix having a plurality of carbon fibers distributed therein as a reinforcement phase. CFRPs are often created from a pre-preg, where the carbon fibers are impregnated with uncured or partially cured resin. A component or part can be formed by using the pre-preg to be laid-up on a mandrel or mold, where it is then consolidated and cured to form the final component.

In various aspects, the present disclosure pertains to use of continuous carbon fibers, which in certain aspects have a length of greater than or equal to about 2 inches, as compared to chopped or milled carbon fibers. In certain aspects, a continuous carbon fiber has a length of greater than or equal to about 2 inches, optionally greater than or equal to about 3 inches, greater than or equal to about 4 inches, optionally greater than or equal to about 5 inches, optionally greater than or equal to about 6 inches, optionally greater than or equal to about 7 inches, optionally greater than or equal to about 8 inches, optionally greater than or equal to about 9 inches, optionally greater than or equal to about 10 inches, optionally greater than or equal to about 11 inches, and in certain variations, optionally greater than or equal to about 12 inches (or 1 foot). Continuous carbon fiber polymeric composites have very high strengths and high stiffness (with high elastic modulus levels). However, without further manipulation, such continuous carbon fiber polymeric composites are not readily made into contoured or complex three-dimensionally shaped parts.

Two techniques are currently used to form complex shaped parts from continuous carbon fiber composites, but both suffer from certain drawbacks. The first technique incorporates continuous carbon fibers into a composite sheet having continuous unidirectional carbon fibers, but then divides the larger composite sheet into multiple smaller pieces (either as a pre-preg or just before application to form the component). The smaller cut pieces are then assembled so that the edges of adjacent pieces overlap in a manual layup process to create a larger structure. The smaller pieces thus have hundreds of thousands of continuous carbon fiber filaments (e.g., cut bundles) that terminate on the same cut line(s). While the smaller pieces can be laid up to create more complex shapes and contours, this technique has the disadvantage of reducing an overall strength of the part, because the unidirectional carbon fiber filaments all end along the same cut line. Even though the cut pieces overlap, there remain various loci or regions for stress propagation and fracture throughout the composite along the cut lines that reduces overall strength.

Alternatively, in another technique, the carbon fiber bundles may be chopped or milled into shorter fiber segments, typically with a maximum length of less than about 2 inches. Each bundle may have approximately 50,000 filaments (e.g., 50K tow), by way of example. Typically the chopped fibers are homogenously distributed in a single orientation within the composite as an anisotropic reinforcement phase. The chopped fibers in the composite permit greater flexibility and generally lower stiffness. However, the short chopped fibers are discontinuous and provide open regions between distinct fibers for stress and crack propagation through the resin/polymeric matrix. While still providing high strengths, chopped carbon fiber composites typically have lower strengths than continuous carbon fiber composites, often an order of magnitude less.

In accordance with the present disclosure, composites comprising continuous carbon fibers are provided that retain high strength levels, but have improved moldability and reduced stiffness as compared to conventional continuous carbon fiber composites. In certain aspects, the method involves manufacturing the carbon fibers to be heterogeneous having intentionally created discrete weak regions along the length of the carbon fiber that permit breaking points when stress or force is applied. The weak regions are formed at discrete and regular noncontiguous intervals along the length of each carbon fiber. A bundle of a plurality of such continuous carbon fiber filaments having the discrete weak regions is also contemplated and can be incorporated into a polymeric composite. As will be discussed further herein, the discrete weak regions are preferably staggered with respect to adjacent continuous carbon fiber filaments.

Figure 1:
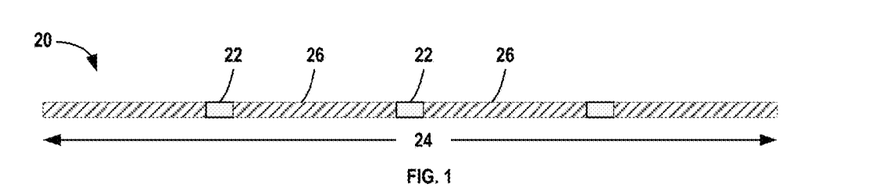
FIG. 1 is schematic of a continuous carbon fiber prepared in accordance with certain aspects of the present disclosure having a plurality of discrete relatively weak regions interspersed within the continuous carbon fiber that serve as break points when force or stress is applied to the continuous carbon fiber.

FIG. 1 shows an exemplary continuous carbon fiber 20 prepared in accordance with certain aspects of the present disclosure. In FIG. 1, the continuous carbon fiber 20 has a plurality of discrete weak regions 22 formed along a length 24 of the carbon fiber 20. Thus, the carbon fiber 20 includes a high strength body 26 having the plurality of weak regions 22 dispersed within the high strength regions of the body 26. In certain aspects, a weak region 22 is intended to mean a region that preferentially fractures or breaks when stress is applied as compared to the remainder of the body 26.

In certain aspects, a weak region may be understood to have a strength (e.g., an ultimate tensile strength) that is at least about 50% less than a comparative ultimate tensile strength of a remainder of the continuous carbon fiber, optionally at least about 60%, optionally at least about 70%, optionally at least about 80%, and in certain aspects, optionally at least about 90% less than a comparative strength of the high strength regions of the remainder of the body of the carbon fiber. In one example, the continuous fiber is PAN-based and has a tensile strength of 5,000 MPa, whereas the weak region is lignin-based and has a tensile strength of 100 MPa. The weak region comprising lignin had about 98% less strength than the strong PAN-based region. In the past, when forming conventional continuous carbon fibers, it has been a goal to avoid introducing impurities or materials that might lead to any weaker regions to ensure that the carbon fibers are of uniformly high strength along the length of the carbon fiber. However, as will be described in greater detail below, introduction of these weak domains or regions in accordance with certain aspects of the present disclosure enables formation of carbon-fiber polymeric composites having high strength and low resistivity to flow, thus being more malleable and moldable.

Figure 2:
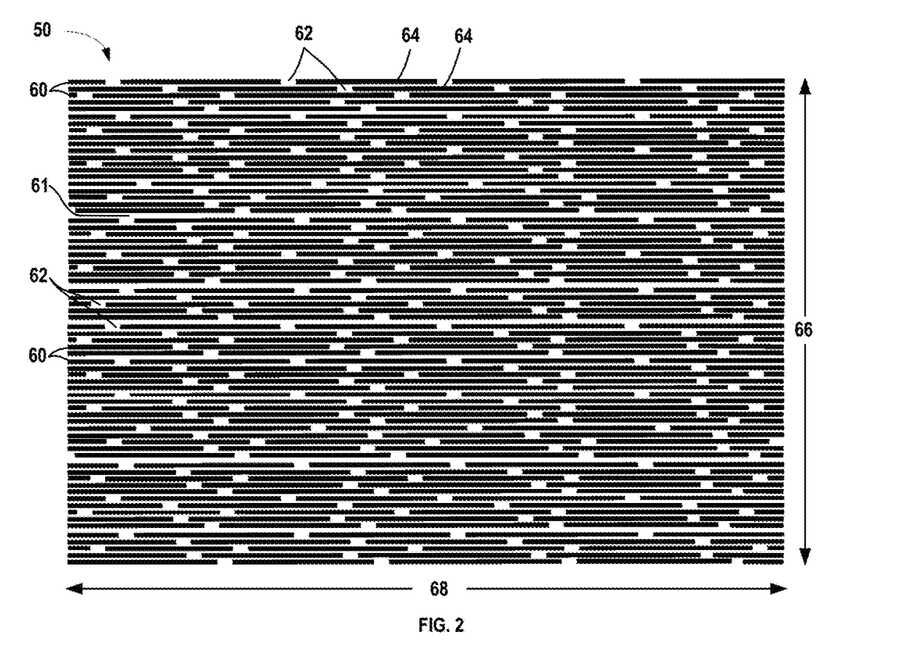
FIG. 2 is a schematic of a polymeric composite having a plurality of continuous carbon fiber filaments prepared in accordance with certain aspects of the present disclosure. Each respective carbon fiber filament has a plurality of discrete, noncontiguous, relatively weak regions or break points interspersed therein.

In FIG. 2, a carbon-fiber reinforced polymeric composite 50 prepared in accordance with certain aspects of the present disclosure is provided. The composite 50 has a plurality of continuous carbon fibers 60 and a polymeric matrix 61 distributed within and around the carbon fibers 60. The continuous carbon fibers 60 have a plurality of weak regions 62 that is noncontiguous and thus distributed at regular intervals along each continuous carbon fiber 60. The plurality of weak regions 62 is staggered throughout the continuous carbon fibers 60 across a width 66 of the composite 50. Thus, the locations of the weak regions 62 differ along a length 68 of each continuous carbon fiber 60 with respect to adjacent carbon fibers 60. In this manner, the continuous carbon fibers 60 are capable of breaking at the weak regions 62 when bent, folded, or otherwise stressed, while not permitting stress and fracture propagation across the width 66 or length 68 of the composite 50. This maintains the strength of the composite 50 to near the same strength levels provided by conventional continuous carbon fibers, but also provides lower stiffness and greater flexibility (with a lower resistance to flow).

In certain aspects, a plurality of continuous carbon fibers (e.g., a bundle of carbon fiber filaments) is contemplated by the present disclosure where each has a plurality of discrete weak regions. A first continuous carbon fiber has a first plurality of discrete weak regions and a second continuous carbon fiber adjacent to the first continuous carbon fiber has a second plurality of discrete weak regions. The first plurality of discrete weak regions is staggered with respect to the second plurality of discrete weak regions when the first continuous carbon fiber and the second continuous carbon fiber are aligned lengthwise.

Figure 3:
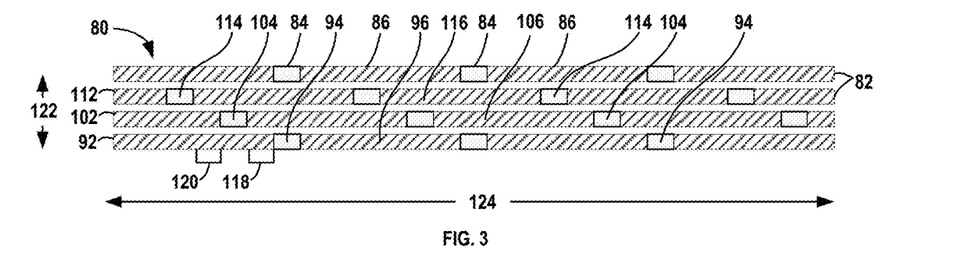
FIG. 3 is a schematic of a bundle of a plurality of continuous carbon fiber filaments prepared in accordance with certain aspects of the present disclosure. Each respective continuous carbon fiber filament has a plurality of discrete, noncontiguous, weak regions interspersed therein. The discrete weak regions are staggered and offset as compared to weak regions in the adjacent carbon fiber filaments.

FIG. 3 further exemplifies this concept, showing a detailed section of a partial view of a bundle 80 having a plurality of continuous carbon filaments or fibers 82. Each carbon fiber includes a plurality of discrete weak regions 84 formed along a body 86 of each fiber 82. A first carbon fiber 92 has a plurality of first discrete weak regions 94 interspersed within a body 96 having relatively higher strength. Each discrete weak region 94 is disposed along the body at regular intervals (e.g., having the same distance between respective weak regions 94). A second carbon fiber 102 is adjacent to the first carbon fiber 92. The second carbon fiber 102 has a plurality of second discrete weak regions 104 interspersed along a length of a body 106 at regular intervals. A third carbon fiber 112 is adjacent to the second carbon fiber 102. The third carbon fiber 112 has a plurality of third discrete weak regions 114 interspersed along a length of a body 116 at regular intervals. As can be seen, the plurality of first discrete weak regions 94 is offset from the second discrete weak regions 104 in the adjacent carbon fiber by a first distance 118. The plurality of second discrete weak regions 104 are likewise offset from the third discrete weak regions 114 in the adjacent third carbon fiber 112 by a second distance 120. In this manner, the plurality of first discrete weak regions 94, the plurality of second discrete weak regions 104, and the plurality of the third discrete weak regions 114 are staggered and offset with respect to both a width 122 and a length 124 of the bundle 80.

As such, while there are break points intentionally introduced into the carbon fibers 82 of the bundles, the weak regions are noncontiguous and dispersed throughout the high strength body 86 of each fiber. This design provides a greater ability to conform and be molded, while minimizing fracture and crack propagation, thus retaining the ultrahigh strengths associated with bundles of continuous carbon fibers. It should be noted that the plurality of weak regions may be spaced at shorter or longer distances from one another and may be spaced at different intervals in distinct continuous carbon fiber/filaments of the bundle. Further, in alternative variations, the spacing between the weak regions may not be uniform between different regions and in certain aspects, may be randomly spaced. Notably, the longer the distance between the weak regions of the continuous carbon fiber, the higher the stiffness and strength of the composite formed when incorporating such continuous carbon fibers. Where greater moldability and flexibility is required for the composite, the distance between the weak regions of the continuous carbon fiber may be shorter. This provides a greater number of break points (higher breakpoint density) within the continuous carbon fibers that will provide a composite with less resistance to flow, but with some diminished strength as well.

In certain aspects, each respective weak region is spaced apart from an adjacent weak region in the continuous carbon fiber by a distance of greater than or equal to about 0.1 inches to less than or equal to about 12 inches. In certain other aspects, a suitable range is greater than or equal to about 3 inches to less than or equal to about 6 inches.

In certain aspects, each respective weak region formed in the continuous carbon fiber provides a weak point capable of breaking, so a length of the weak region in the fiber is of less importance than the length between weak regions. However, in certain variations, a weak region may have a length of less than or equal to about 0.01 inches. In certain aspects, each weak region has a length of greater than or equal to about 0.10 inches to less than or equal to about 1.0 inch.

In certain aspects, the present disclosure contemplates a method of producing a continuous carbon fiber for use in composites having enhanced moldability. By way of background, a typical process for forming a carbon fiber includes first forming a carbon fiber precursor. A polymer based carbon fiber precursor is transformed into a carbon fiber filament. Thus, one or more monomers are polymerized to form a polymer material. In certain variations, the polymer material comprises an acrylic polymer material. In certain aspects, the polymer material is formed from an acrylonitrile monomer and thus may be a polyacrylonitrile (PAN) polymer. In conventional carbon fiber precursor formation, one of more comonomers may be polymerized with the acrylonitrile monomer. The acrylic polymer material may a copolymer formed from an acrylonitrile monomer and a second monomer selected from the group consisting of: acrylic acid, itaconic acid, methacrylic acid, vinyl esters, such as methyl acrylate, ethyl acrylate, butyl acrylate, methyl methacrylate, vinyl acetate, and the like, vinyl amides, such as acrylamide, diacetone acrylamide, and the like, vinyl halides, such as allyl chloride, vinyl bromide, vinyl chloride, and the like, salts of vinyl compounds, such as quaternary ammonium salt of aminoethyl-2-methylpropeneoate, salts of sulfonic acids, such as sodium vinyl sulfonate, sodium p-styrene sulfonate, and the like, and combinations thereof. The most frequently used comonomers include itaconic acid, methacrylic acid, acrylic acid, and/or acrylamide polymerized with acrylonitrile.

After the polymerization, the acrylic polymer material may be combined with one or more carriers or solvents and then spun, for example, by melt or solution spinning, to form a plurality of continuous precursor fiber or filaments. The spinning process for acrylic PAN-based polymer precursors may be performed using traditional manufacturing techniques that are well known. The spinning process may include forming the precursor fibers in a spinning bath by ejecting the polymer material from a nozzle or a spinneret. The precursor fibers may then be conveyed to a second washing bath to wash the fibers from solvents and then the precursor fibers may pass through a drawing bath. The fibers may be stretched in such a drawing bath. The precursor fibers may then be dried. The carbon fiber precursor may be stretched to enable molecular alignment. The carbon fiber precursor may be wound on a creel for transport to a manufacturing facility for forming carbon fibers from the precursor fibers.

Figure 4:
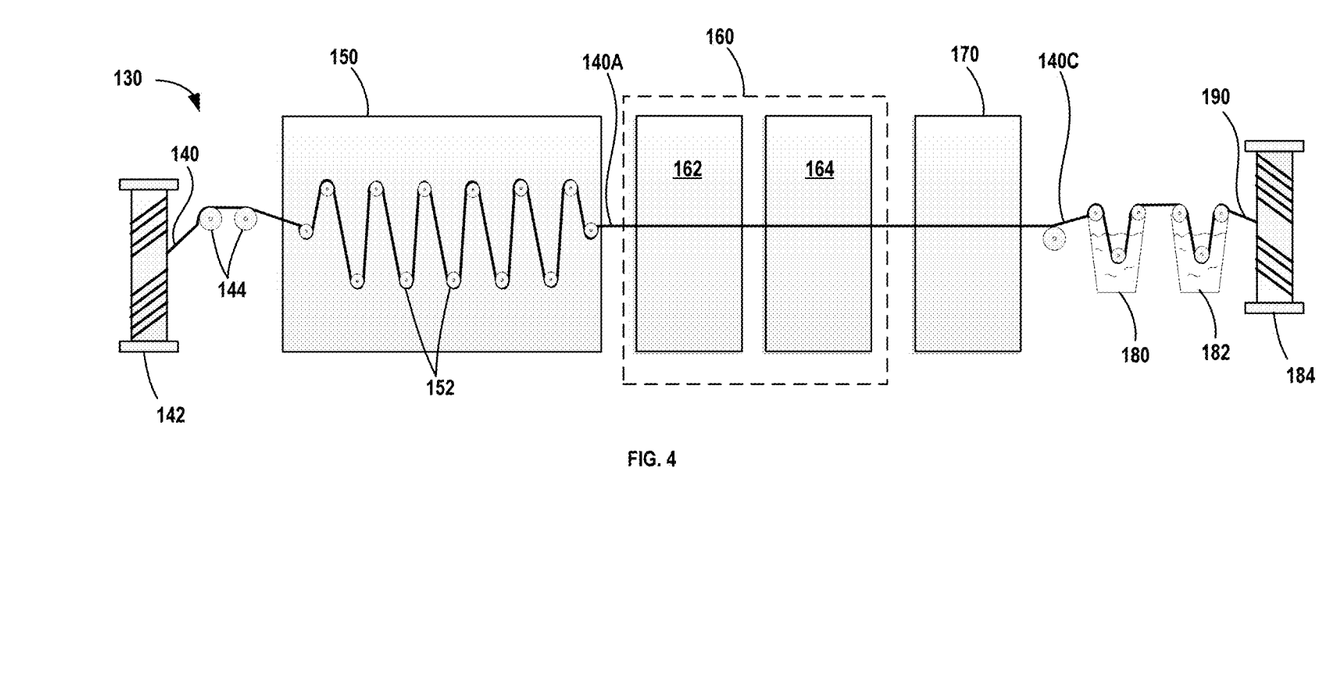
FIG. 4 shows an exemplary carbon fiber manufacturing process, including zones for thermal stabilization, carbonization, and graphitization of the precursor fibers.

An exemplary carbon fiber manufacturing process 130 is shown in FIG. 4. Prior to heat treating to begin the process of forming the carbon fiber, the precursor fibers may be spread flat to form a tow band for a warp sheet. The continuous precursor fiber 140 is provided on a creel 142. The precursor fiber 140 may be pretreated and stretched over a plurality of stretching rollers 144. The precursor fiber 140 may be subjected to an initial thermal stabilization (e.g., oxidation) process to obtain high quality carbon fibers. Such an initial thermal stabilization step is typically conducted by introducing the precursor fiber 140 into a heated environment, here an oxidation furnace 150. The precursor fibers 140 are heated at a controlled relatively low-temperature, for example, 200-300° C. in air to convert to a form that can be further heat-treated without either melting or fusion of the fibers. The linear PAN-based polymer precursor is typically at least partially converted to cyclic structures during this initial thermal stabilization step. Thus, the stretched precursor fiber 140 may then be passed through the oxidation oven 150, during which, oxygen from the air combines with the carbon fiber precursor to form cross-linked polymer chains. The temperature and airflow in the oxidation oven is modified to supplement the composition of the carbon fiber precursor. Notably, a plurality of rollers 152 is used in the oxidation oven 150 to convey the precursor fiber 140 through the length of the oxidation oven 150. As shown, the plurality of rollers 152 conveys the precursor fiber 140 in an undulating pattern to enhance exposure to the relatively low temperature heat. However, such a configuration is merely exemplary.

Next, the thermally stabilized precursor fiber 140A exiting the oxidation furnace 150 may be subjected to one or more heating steps that perform carbonization and graphitization. These steps are typically conducted in one or more ovens or furnaces with an inert atmosphere. The thermally stabilized precursor fiber 140A next enters a carbonization environment or zone 160. While temperatures may vary, carbonization is typically performed at temperatures of at least 1,500-1,600° C. As shown in FIG. 4, the carbonization zone 160 includes a first carbonization oven or furnace 162 and a second carbonization oven or furnace 164. Within each carbonization furnace (162, 164) is an inert (e.g., oxygen-free and oxidant-free) atmosphere. The temperature of the first carbonization furnace 162 and second carbonization furnace 164 progressively increases causing non-carbon molecules to particulate in the absence of oxygen. The particulate is then exhausted from the oven. The second carbonization furnace 164 may have a relatively higher temperature (e.g., about 1,500-1,800° C.) than the first carbonization furnace (e.g., about 700-1,000° C.) 162. The number of carbonization ovens or furnaces through which the thermally stabilized precursor fibers 140A is passed may depend on the grade of carbon fiber being manufactured. Stretching continues as the thermally stabilized precursor fiber 140A passes through the carbonization furnaces 162, 164.

An additional heat treatment step may also be conducted for graphitization. Next, the carbon fiber precursor 140B thus exits the second carbonization furnace 164 in the carbonization zone 160 and then may enter an optional graphitization furnace 170 for additional heat treatment. Graphitization typically occurs by heating the carbon fiber precursor 140B to a temperature in a range of greater than or to about 1,600° C.-3,000° C. Graphitization provides a high modulus in the carbon fiber formed. Thus, in certain variations, a two-step heating process may be conducted to form the carbon fiber, first a relatively low temperature carbonization process that occurs in the carbonization zone 160 followed by an optional high-temperature graphitization process that occurs in a graphitization furnace 170, depending on the final carbon fiber properties that are required.

After the carbon fiber precursor 140C has been heated by carbonization and graphitization, it exits the graphitization furnace 170. Further processing may be conducted on the carbon fiber precursor 140C, including treating the surface in a surface treatment tank 180 and then treating in a sizing tank 182. After being surface treated and sized, the final carbon fiber product 190 is formed. The carbon fiber product 190 can be spooled on a second creel 184 for later processing and use (e.g., incorporation into pre-preg or composite materials), or it may be spread flat and mixed with a polymeric resin to form a sheet of pre-preg. It should be noted that the carbon fiber manufacturing discussed above is typically not just for a single carbon fiber, but rather the carbon fiber product 190 includes thousands of fibers or filaments processed in these steps at the same time.

In certain aspects, the present disclosure thus provides methods of producing or manufacturing a continuous carbon fiber for use in composites having enhanced moldability. The method may include introducing a continuous precursor fiber comprising an acrylic polymer material into a heated environment, such as an oven or a furnace. The method further includes in certain variations, directing laser energy towards a plurality of discrete target regions of the continuous precursor fiber while in the heated environment (e.g., while the precursor is in the oven or furnace) to create a continuous carbon fiber having a plurality of discrete weak regions corresponding to the plurality of discrete target regions. Other sources of energy similar to lasers may also be employed in alternative variations. The heated environment may be selected from an oxidation oven or furnace for thermally stabilizing the continuous carbon fiber, a carbonization oven or furnace for carbonizing the continuous carbon fiber, and/or a graphitization oven or furnace for graphitizing the continuous carbon fiber.

The discrete regions are thus predetermined regions or domains within the carbon fiber. The plurality of discrete regions correspond to and forms the plurality of discrete weak regions after all of the heating steps are completed (e.g., via thermal stabilization, carbonization, and/or graphitization processes) and additional processing is finished to form the carbon fiber. Thus, laser energy is applied in select regions of the continuous precursor fiber to form a heterogeneous continuous carbon fiber having a plurality of discrete weak regions patterned thereon by applying laser energy.

Thus, the method includes directing laser energy at a plurality of discrete noncontiguous target regions. Heterogeneous regions are formed as a result of discrete noncontiguous localized molecular structural disruptions at the filament level of the carbon fiber precursor during the heating process. The plurality of discrete regions has a different molecular organization than the remainder of the continuous precursor fiber, because the laser energy interrupts the localized reactions and molecular reorganization. Application of laser energy and thus localized heat truncates the molecular organization process (e.g., crystallization) and results in localized molecular structural disruption that creates weaker regions than those regions that are permitted to be heated in a typical manner during the carbon fiber manufacturing.

Figure 5:
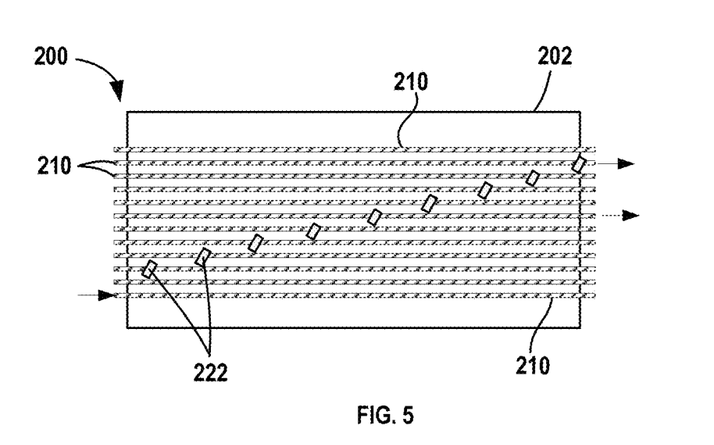
FIG. 5 shows a system for applying laser energy to continuous carbon fiber precursors while in a heated environment like an oven to form a plurality of discrete regions having localized molecular disruptions that will serve as weak regions or break points when processed to be a carbon fiber in accordance with certain aspects of the present disclosure.

Such a process can occur in a heated environment 200, such as an oven 202 shown in FIG. 5. The oven 202 may bean an oxidation oven or furnace for thermally stabilizing the continuous carbon fiber, a carbonization oven or furnace for carbonizing the continuous carbon fiber, and/or a graphitization oven or furnace for graphitizing the continuous carbon fiber. A precursor fiber 210 for example, polyacrylonitrile (PAN) can be processed by being introduced into the oven 202. Laser energy may be applied to discrete hit points or regions 222 of the precursor fiber 210. The laser energy may be applied by conventional laser sources and directed from one or more sources above or below the oven 200 towards the precursor fiber 210. An apparatus, such as a splitter, may be used to deliver the laser energy in the predetermined pattern onto various regions of the precursor fiber 210. As can be seen in FIG. 5, discrete regions 222 are staggered and spaced lengthwise from one another. The laser energy can be applied periodically to generate discrete, noncontiguous spaced apart regions within each precursor fiber 210 that will form the weak regions in the carbon fiber. As will be appreciated by those of skill in the art, the regions of the precursor fiber 210 where the laser energy may be applied may vary in configuration, spacing, and placement on the streams.

In certain variations, the heated environment (e.g., 200) is an oxidation oven for thermally stabilizing the continuous carbon fiber. The oxidation oven may have a temperature of greater than or equal to about 200° C. to less than or equal to about 300° C. In other variations, the heated environment is a carbonization oven for carbonizing the continuous carbon fiber. The carbonization oven may have a temperature of greater than or equal to about 1,500° C. In yet other variations, the heated environment is a graphitization oven for graphitizing the continuous carbon fiber. The graphitization oven has a temperature of greater than or equal to about 1,600° C. to less than or equal to about 3,000° C.

The acrylic polymer material may be a copolymer formed from an acrylonitrile monomer and a second monomer selected from the group consisting of: acrylic acid, itaconic acid, methacrylic acid, vinyl esters, vinyl amides, vinyl halides, salts of vinyl compounds, salts of sulfonic acids, and combinations thereof. Each respective discrete weak region of the plurality of discrete weak regions is sufficient to provide a break point. In certain aspects, each respective discrete weak region of the plurality of discrete weak regions has a length of greater than or equal to about 0.1 inches to less than or equal to about 1.0 inches. In further aspects, each respective discrete target region is spaced apart from an adjacent weak region in the continuous carbon fiber by a distance of greater than or equal to about 0.1 inches to less than or equal to about 12 inches. The continuous carbon fiber that is formed may be a plurality of continuous carbon fibers each having an average length of greater than or equal to about 6 inches to less than or equal to about 12 inches.

The present disclosure also provides methods of producing a continuous carbon fiber for use in composites having enhanced moldability. The method comprises introducing a continuous precursor fiber comprising an acrylic polymer material into a heated environment, such as an oven or a furnace. The method further includes in certain variations, creating a plurality of discrete noncontiguous weak regions by intermittently applying mechanical stress to discrete target regions of the continuous precursor fiber while in the heated environment. The applying of mechanical stress forms a continuous carbon fiber having a plurality of discrete noncontiguous weak regions corresponding to the plurality of discrete target regions. It should be noted that the amount of mechanical stress applied to the precursor fiber in the heated environment preferably does not cut or puncture the precursor fiber; rather it merely creates localized disruptions or weaknesses by stretching the precursor fiber while it is heated. The heated environment may be selected from an oxidation oven or furnace for thermally stabilizing the continuous carbon fiber, a carbonization oven or furnace for carbonizing the continuous carbon fiber, and/or a graphitization oven or furnace for graphitizing the continuous carbon fiber. In certain aspects, the intermittent application of mechanical stress may be conducted by pinching the continuous precursor fiber(s) while in the heated environment.

Figure 6:
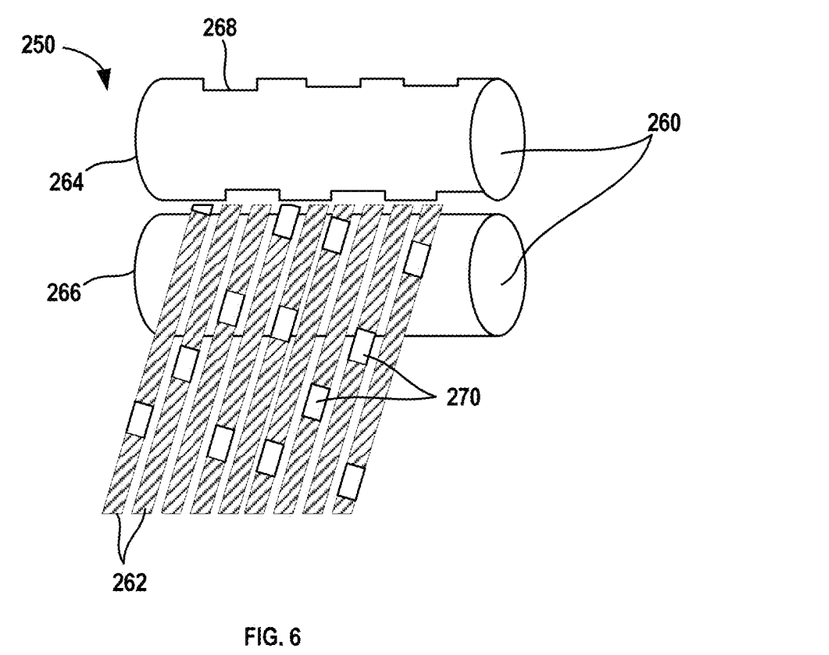
FIG. 6 shows a roller device system for applying intermittent mechanical pressure to continuous carbon fiber precursors while in a heated environment like an oven to form a plurality of discrete regions that will serve as weak regions or break points when processed to be a carbon fiber in accordance with certain aspects of the present disclosure.

FIG. 6 shows one exemplary system 250 for intermittently application of mechanical stress may be conducted by pinching. As shown, a pair of roller devices 260 may be disposed within the oven to process a plurality of continuous precursor fibers 262, as described previously above. The pair of roller devices 260 includes a first roller 264 and a second counter-roller 266 set in tension against one another. The plurality of continuous precursor fibers 262 thus passes between the first roller 264 disposed above the precursor fibers 262 and the second counter-roller 266 set below the precursor fibers 262 on the bottom. As shown, the first roller 262 has a patterned surface with a plurality of depressions 268 creating a contoured surface, while the second counter-roller 266 has a smooth cylindrical shape. The first roller 264 thus has the ability to apply pressure and pinch the precursor fibers 262 in discrete selective target regions 270. In this manner, as the pair of roller devices 260 rotates, the precursor fibers 262 are selectively pinched by applied intermittent mechanical force to form the plurality of discrete weak regions in the carbon fiber that is eventually formed. It should be noted that the contoured surface is merely exemplary and that other patterns or entirely smooth surfaces may be used. The amount of tension and force applied between the pair of roller devices 260 may be adjusted to create differing amounts of pinching and deformation of the precursor fibers 262. Further, the roller devices 260 may be independently heated to enhance deformation, for example, by an internal heating element (not shown). It should be noted that in certain aspects, the precursor fiber remains intact and continuous even after intermittent application of mechanical stress by pinching that creates localized deformation and stress. This can be contrasted to cutting or fraying of the carbon fibers.

Figure 7:
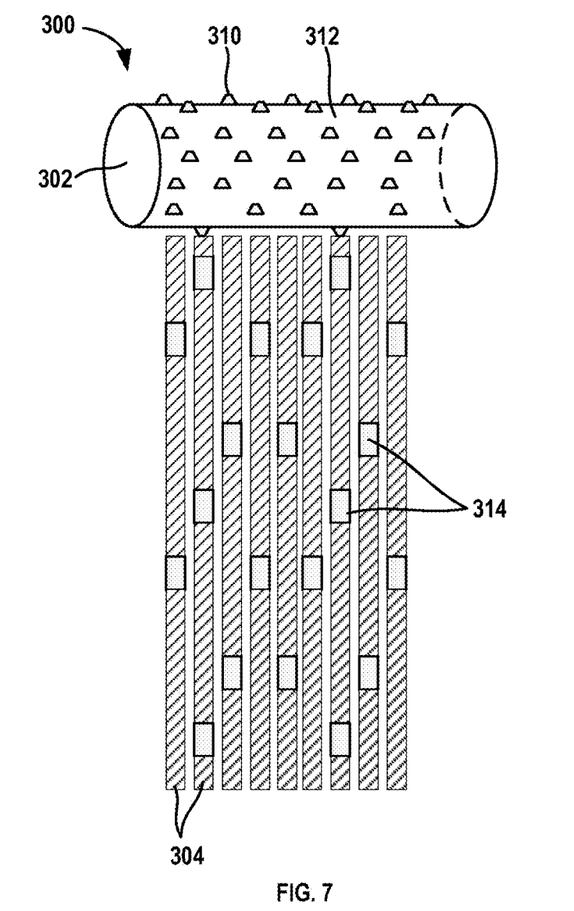
FIG. 7 shows another alternative roller device having a plurality of protrusions for applying intermittent mechanical pressure to continuous carbon fiber precursors while in a heated environment like an oven to form a plurality of discrete regions that will serve as weak regions or break points when processed to be a carbon fiber in accordance with certain aspects of the present disclosure.

In another aspect, mechanical stress, laser ablation, or both mechanical stress and laser ablation are applied to the continuous fibers. In another exemplary system 300 shown in FIG. 7, intermittent application of mechanical stress may be conducted by passing the fibers over one or more rollers having surface projections. As shown, a roller device 302 may be disposed after the formation of the pre-preg to process a plurality of continuous precursor fibers 304, as described previously above. While the roller device 302 is shown in FIG. 7 is shown as processing the precursor fibers 304 by itself, while not shown, it may also be paired with a counter-roller set in tension against one another. The plurality of continuous precursor fibers 304 thus passes under the roller device 302. As shown, the roller device 302 has a patterned surface with a plurality of protrusions 310 extending from a surface 312. In certain variations, the protrusions 310 are shaped so as to apply mechanical stress to the precursor fibers 304, while avoiding cutting the precursor fibers so that they remain intact and continuous. In other variations, the protrusions 310 are shaped to create cuts in the continuous fibers as they pass by. The protrusions 310 may have a width of less than about 0.1 mm with a height sufficient to cut the carbon fibers.

The roller device 302 has the ability to apply pressure to the precursor fibers 304 in discrete selective target regions 314. In this manner, as the roller device 302 rotates, the precursor fibers 304 have intermittent mechanical force applied in discrete target regions to form the plurality of discrete weak or broken regions in the carbon fiber. It should be noted that the shape of the protrusions 310 is merely exemplary and that other shapes may be used to the extent that they do not cut the precursor fibers 304 in a large bundle. This can be distinguished from conventional processes where nubs on rollers are used merely to spread and distribute the carbon fibers, but not to introduce weak or broken regions into the continuous filaments. Further, laser ablation may also be applied to the discrete target regions of the carbon fiber in addition to or as an alternative to the mechanical stress to create the plurality of discrete weak or broken regions.

In yet other aspects, the present disclosure contemplates a method for manufacturing a continuous carbon fiber for use in composites having enhanced moldability. The method may comprise introducing a continuous precursor fiber comprising an acrylic polymer material into an oxidation oven for thermally stabilizing the continuous precursor fiber. The precursor fiber may then be introduced into one or more carbonization ovens for carbonizing the continuous carbon fiber. An optional further step is introducing the precursor fiber into a graphitization oven. After the final heating step for inducing carbonization and/or graphitization, the carbon fiber is then subjected to further processing. For example, mechanical stress may be applied intermittently to discrete target regions of the continuous carbon fiber to create a plurality of discrete noncontiguous intact weak regions in the continuous carbon fiber. This application of stress induces localized deformation and stretching, but can be contrasted with cutting or fraying of the carbon fiber bundles that occurs in a chopping process to create chopped or milled carbon fibers. In other variations, mechanical stress may be applied to create cut regions within the carbon fiber bundles. A roller having protrusions, such as roller 300 shown in FIG. 7 may be used to apply the pressure to the continuous carbon fiber during such a post-manufacturing process. In certain variations, the protrusions may cut the carbon fibers, while in other variations; mechanical stress is applied without cutting the carbon fiber filaments.

In various aspects, the present disclosure contemplates the method comprising introducing a plurality of discrete noncontiguous target regions into a carbon fiber precursor and ultimately into the carbon fiber formed. The heterogeneity may be created by localized molecular or structural disruptions. This technique enhances the flexibility and moldability of carbon fibers, permitting the continuous carbon fibers to be molded to follow the contours of a surface. This improves the surface quality of unpainted composite panels by avoiding fiber distortion around curvatures. In this manner, an improved carbon fiber composite is provided having little or no loss of mechanical properties, the benefits of which can be achieved with negligible additional manufacturing costs.

In certain aspects, the present disclosure contemplates a method of manufacturing or producing a bundle continuous carbon fibers for use in composites having enhanced moldability. The method comprises incorporating a plurality of discrete regions into a plurality of continuous precursor fibers comprising an acrylic polymer material comprising polyacrylonitrile. The plurality of continuous precursor fibers forms the bundle of continuous carbon fiber. The incorporating process can be conducted in a heated environment that the precursor fiber passes, for example, in a thermal stabilization or oxidation furnace or oven, a carbonization furnace or oven, or a graphitization furnace or oven. The incorporating can be achieved by applying laser energy or intermittent mechanical stress to the precursor fibers while in the heated environment. After carbonization and graphitization, a plurality of discrete weak regions are formed in each continuous carbon fiber of the bundle corresponding to the plurality of discrete regions that were formed in the precursor fibers.

In other aspects, the present disclosure provides a carbon fiber composite having enhanced moldability. The carbon fiber composite includes a polymeric matrix incorporating one or more continuous carbon fibers. In certain aspects, the continuous carbon fibers have a length of greater than or equal to about 2 inches. The one or more continuous carbon fibers comprise a plurality of discrete weak regions. The plurality of weak regions has a strength (e.g., an ultimate tensile strength) that is at least 50% less the strength of a remainder of the body of the continuous carbon fiber. In certain aspects, as discussed above, the weak region may have a strength that is at least about 60% less than a comparative strength of a remainder of the continuous carbon fiber, optionally at least about 80%, and in certain aspects, optionally at least about 90% less than a comparative strength of the high strength regions of the remainder of the body of the carbon fiber.

In certain aspects, the present disclosure provides a moldable carbon fiber composite pre-preg incorporating the continuous carbon fibers having one or more weak regions and with a 50% mold coverage that can flow and fill the mold cavity under less than 7 MPa compression molding to produce a 1.5 mm panel.

In other aspects, a moldable carbon fiber composite incorporating the continuous carbon fibers having one or more weak regions provided by the present disclosure still has an ultrahigh strength, for example, an ultimate tensile strength of greater than or equal to about 500 MPa, optionally greater than or equal to about 1,000 MPa, optionally greater than or equal to about 1,500 MPa, optionally greater than or equal to about 1,750 MPa, and in certain aspects, optionally greater than or equal to about 2,000 MPa.

The moldable carbon fiber composites are particularly suitable for use in components of an automobile or other vehicles (e.g., motorcycles, boats), but may also be used in a variety of other industries and applications, including aerospace components, industrial equipment and machinery, farm equipment, heavy machinery, by way of non-limiting example. For example, the carbon fiber composites having improved moldability according to the present disclosure may be used to form automotive structural components having contoured or complex three-dimensional shapes. Non-limiting examples include hoods, pillars, such as hinge pillars, panels, including structural panels, door panels, and door components, interior floors, floor pans, roofs, exterior surfaces, underbody shields, wheels, storage areas, including glove boxes, console boxes, trunks, trunk floors, truck beds, lamp pockets and other components, shock tower cap, control arms and other suspension, crush cans, bumpers, structural rails and frames, cross car beams, undercarriage or drive train components, and the like.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of manufacturing a continuous carbon fiber for use in composites having enhanced moldability, the method comprising:
    introducing a continuous precursor fiber comprising a polymer material into a heated environment; and
    directing laser energy towards a plurality of discrete target regions of the continuous precursor fiber while in the heated environment to create a continuous carbon fiber having a plurality of discrete weak regions corresponding to the plurality of discrete target regions.

2. The method of claim 1, wherein the heated environment is an oxidation oven or oxidation furnace for thermally stabilizing the continuous carbon fiber.

3. The method of claim 2, wherein the oxidation oven has a temperature of greater than or equal to about 200° C. to less than or equal to about 300° C.

4. The method of claim 1, wherein the heated environment is a carbonization oven or carbonization furnace for carbonizing the continuous carbon fiber.

5. The method of claim 4, wherein the carbonization oven has a temperature of greater than or equal to about 1,500° C.

6. The method of claim 1, wherein the heated environment is a graphitization oven or graphitization furnace for graphitizing the continuous carbon fiber.

7. The method of claim 6, wherein the graphitization oven has a temperature of greater than or equal to about 1,600° C. to less than or equal to about 3,000° C.

8. The method of claim 1, wherein each respective discrete target region is spaced apart from an adjacent weak region in the continuous carbon fiber by a distance of greater than or equal to about 0.1 inches to less than or equal to about 12 inches.

9. The method of claim 1, wherein the continuous carbon fiber formed is a plurality of continuous carbon fibers each having an average length of greater than or equal to about 2 inches.

10. A method of manufacturing a continuous carbon fiber for use in composites having enhanced moldability, the method comprising:
    introducing a continuous precursor fiber comprising a polymer material into a heated environment, wherein the polymer material is an acrylic copolymer formed from an acrylonitrile monomer and a second monomer selected from the group consisting of: acrylic acid, itaconic acid, methacrylic acid, vinyl esters, vinyl amides, vinyl halides, salts of vinyl compounds, salts of sulfonic acids, and combinations thereof; and
    directing laser energy towards a plurality of discrete target regions of the continuous precursor fiber while in the heated environment to create a continuous carbon fiber having a plurality of discrete weak regions corresponding to the plurality of discrete target regions.

11. A method of manufacturing a continuous carbon fiber for use in composites having enhanced moldability, the method comprising:
    introducing a continuous precursor fiber comprising a polymer material into a heated environment; and
    directing laser energy towards a plurality of discrete target regions of the continuous precursor fiber while in the heated environment to create a continuous carbon fiber having a plurality of discrete weak regions corresponding to the plurality of discrete target regions, wherein each respective discrete weak region of the plurality of discrete weak regions has a length of less than or equal to about 2 inches and each respective discrete target region is spaced apart from an adjacent weak region in the continuous carbon fiber by a distance of greater than or equal to about 0.1 inches to less than or equal to about 12 inches.

12. The method of claim 11, wherein the continuous carbon fiber formed is a plurality of continuous carbon fibers each having an average length of greater than or equal to about 2 inches.

* * * * *